(12) United States Patent
Li et al.

(10) Patent No.: US 10,690,576 B2
(45) Date of Patent: Jun. 23, 2020

(54) EXPERIMENT DEVICE AND METHOD FOR DETECTING ABRASION OF CONVEYER

(71) Applicant: TAIYUAN UNIVERSITY OF TECHNOLOGY, Shanxi (CN)

(72) Inventors: Junxia Li, Shanxi (CN); Ziming Kou, Shanxi (CN); Yuan Wang, Shanxi (CN); Qipeng Ma, Shanxi (CN); Xiaobing Yang, Shanxi (CN); Tenglong Hou, Shanxi (CN); Bin Feng, Shanxi (CN); Jixin Wang, Shanxi (CN)

(73) Assignee: TAIYUAN UNIVERSITY OF TECHNOLOGY, Shanxi (CN)

( * ) Notice: Subject to any disclaimer, the term of this patent is extended or adjusted under 35 U.S.C. 154(b) by 199 days.

(21) Appl. No.: 15/767,559

(22) PCT Filed: Mar. 15, 2017

(86) PCT No.: PCT/CN2017/076690
§ 371 (c)(1),
(2) Date: Apr. 11, 2018

(87) PCT Pub. No.: WO2018/129800
PCT Pub. Date: Jul. 19, 2018

(65) Prior Publication Data
US 2019/0086310 A1   Mar. 21, 2019

(30) Foreign Application Priority Data

Jan. 11, 2017   (CN) .......................... 2017 1 0018542

(51) Int. Cl.
*G01N 3/56* (2006.01)
*G01N 5/04* (2006.01)
*G01M 1/00* (2006.01)

(52) U.S. Cl.
CPC ............... *G01N 3/56* (2013.01); *G01M 1/00* (2013.01); *G01N 5/04* (2013.01);
(Continued)

(58) Field of Classification Search
CPC .. G01N 3/56; G01N 3/12; G01N 3/02; G01N 5/04; G01N 2203/0037; G01N 2203/0282;
(Continued)

(56) References Cited

U.S. PATENT DOCUMENTS

2016/0377519 A1*  12/2016  Norman ................... G01N 3/56
                                                                73/7

FOREIGN PATENT DOCUMENTS

CN      103674750 A      3/2014
CN      104609133 A      5/2015
(Continued)

*Primary Examiner* — Suman K Nath
(74) *Attorney, Agent, or Firm* — Saliwanchik, Lloyd & Eisenschenk

(57) ABSTRACT

An experiment device for aiding in measuring abrasion of a conveyer, and a method for detecting abrasion of a conveyer, are provided. The device includes a rack, a reciprocation sliding mechanism, a speed adjusting mechanism and a crankshaft. The reciprocation sliding mechanism can include scrapers and scraper chains, and the scraper chains can be arranged between an upper-layer scraper and a lower-layer scraper. The speed adjusting mechanism can include a motor, a friction driving wheel and a friction driven wheel, and the motor is connected with the friction driving wheel through a motor shaft. The friction driving wheel slides on a shaft in an axial direction, and speed adjustment can be achieved by changing the distance between the centers of the friction driving wheel and the friction driven wheel.

10 Claims, 3 Drawing Sheets

(52) U.S. Cl.
 CPC ........... *G01N 2203/0005* (2013.01); *G01N 2203/0037* (2013.01); *G01N 2203/027* (2013.01); *G01N 2203/0282* (2013.01); *G01N 2203/0676* (2013.01)

(58) Field of Classification Search
 CPC ..... G01N 2203/027; G01N 2203/0676; G01N 2203/0005; G01M 1/00; G01M 99/007
 USPC .............................. 73/7, 1.89, 9, 150 R, 818
 See application file for complete search history.

(56) References Cited

FOREIGN PATENT DOCUMENTS

| | | |
|---|---|---|
| CN | 204831950 U | 12/2015 |
| CN | 106289759 A | 1/2017 |
| JP | 2004020319 A | 1/2004 |

\* cited by examiner

Section A-A

US 10,690,576 B2

EXPERIMENT DEVICE AND METHOD FOR DETECTING ABRASION OF CONVEYER

CROSS REFERENCE TO RELATED APPLICATIONS

This application is a National Stage Application of International Application Number PCT/CN2017/076,690, filed Mar. 15, 2017; which claims priority to Chinese Application No. 201710018542.5, filed Jan. 11, 2017.

TECHNICAL FIELD

The present invention relates to an experiment device and a method for detecting abrasion of a conveyer, which belongs to the machinery field.

BACKGROUND ART

A scraper conveyer is an important component in coal mine transportation. The economic benefit of coal production directly depends on whether the scraper conveyer can normally operate or not. A friction pair of a middle groove is a key component of the scraper conveyer, and the life of the friction pair decides life and transportation volume of the conveyer. Each year, 300,000 to 400,000 sections of scraper conveyer middle grooves are disabled by abrasion in China, 36,000 to 48,000 tons of steels are consumed, worth 126 to 168 million Yuan. Moreover, due to abundant kinds of coals, adopting uniformly the same type of material for the middle groove of the scrapper conveyer goes against realizing the maximum economic benefit.

Therefore, it is necessary to study friction between the friction pairs of the conveyer. However, since the conveyer has a huge volume and an expensive cost in the actual production, the new developed material is not always made into finished products of the mechanical structural parts. Creating a simulation experiment device can both reduce high experiment cost at the initial stage of material development and match with the actual working condition well, so as to simulate actual friction well.

CONTENTS OF THE INVENTION

The present invention aims to provide an experiment device and a method for detecting abrasion of a conveyer.

The present invention provides an experiment device for detecting abrasion of a conveyer, including a rack, a reciprocation sliding mechanism, a speed adjusting mechanism and a crankshaft.

The rack is a main body for bearing various components; the reciprocation sliding mechanism and the crankshaft are fixed on one side of the rack, and the speed adjusting mechanism is fixed on the other side of the rack.

The reciprocation sliding mechanism includes scrapers and scraper chains; the scraper chains are arranged between an upper-layer scraper and a lower-layer scraper; the upper-layer scraper and the lower-layer scraper forms a group; several groups of scrapers are arranged in parallel; a material groove is fixed inside the rack; the scrapers are placed on the material groove and move in a reciprocating manner; the end of the rack is provided with a connecting block; and the upper-layer and the lower-layer scrapers are connected with the connecting block through a fixed pin.

The lower part of the connecting block is fixedly connected with two connecting rods through a pin shaft, and the upper part of the connecting block is connected with the scrapers;

The speed adjusting mechanism includes a motor, a friction driving wheel and a friction driven wheel; the motor is connected with the friction driving wheel through a motor shaft; the friction driving wheel slides on the motor shaft in an axial direction; speed adjustment is realized by changing a distance between the centers of the friction driving wheel and the friction driven wheel; the motor is a speed adjusting motor that realizes a motor output speed by adjusting a frequency.

The shaft of the friction driven wheel is connected with the crankshaft; the driven wheel is in interference fit with the crankshaft; the crankshaft is fixed with the connecting block through two connecting rods to drive the scraper chains and the scrapers in a reciprocating manner at the adjusted speed, so as to realize reciprocation motion of the material in the material groove; and friction between the friction pairs when the actual conveyer conveys the material can be simulated well, thus experiments on the complex conveyer structure can be avoided.

In the experiment device, the speed adjusting mechanism is driven by the friction wheel to change a distance between the centers of the driving wheel and the driven wheel, so as to realize speed change of the system.

In the experiment device, the material groove is provided with a circular or a square test piece hole; a pressure sensor is directly placed on the bottom of a test piece; the test piece is placed in the test piece hole;

In the experiment device, the crankshaft consists of 2 cranks.

In the experiment device, the sliding speed of the reciprocation sliding mechanism is 1 m/min to 5 m/min.

In the experiment device, the contact surface of the friction driving wheel and the friction driven wheel has a hatching knurling structure.

In the experiment device, the upper-layer and lower-layer scrapers are connected through a fixed pin; a flat-link chain of the scraper chain is clamped by the fixed pin of the scraper; the connecting block and the connecting rods are connected with a pin shaft; and rotational motion of the crankshaft is transformed into reciprocation motion of the material driven by the scrapers.

The present invention provides a method for detecting abrasion of a conveyer, including the following steps:

(1) machining an object to be measured into a sheet test piece, weighing the mass $m_1$ of the sheet with a balance before experiment, then placing the sheet test piece in a test piece hole formed on a material groove; placing a material to be simulated in the material groove; measuring a material pressure on the test object by a pressure sensor arranged on the bottom of the test piece, and recording data;

(2) setting an output rotational speed of the motor according to the sliding speed required in the experiment;

(3) washing the measured object after the experiment is finished, then weighing by the balance to obtain the mass $m_2$ after experiment;

(4) finally calculating to obtain the mass difference $m_2-m_1$, i.e., abrasion loss of the test piece during experiment.

In the above method, the sheet test piece has a cuboid or cylindrical structure with a size of 100×60×10 mm, or Φ60×10 mm, or Φ80×10 mm.

The present invention establishes abrasion measurement for the actual transportation process of the conveyer. The present invention can simulate abrasion of the middle groove of the scraper conveyer by adding scraper chains, can simulate abrasion of the belt conveyer or other types of conveyers by changing the bottom frictional structure into an adhesive tape, can simulate friction at different operation speeds well by introducing adjustable motor and control system as well as a stepless speed changing transmission of the friction wheel, and thus realizes good simulation of the actual friction with a low cost.

Beneficial Effects:

(1) Fine adjustment of the speed can be realized by the speed adjusting motor and the control system;
(2) The stepless speed changing transmission of the friction wheel can realize simulation of actual speed control;
(3) The large-distance linear motion is transformed into reciprocation motion, reducing the volume;
(4) For the crank connecting structure, in case of meeting design requirement and criterion for the composite four-bar, the angle of the circular bead and the bearing structure are increased to prevent occurrence of jamming and smashing at the rotation dead point;
(5) Through flexible replacement of the bottom friction pairs, friction between friction pairs of various conveyer can be simulated well, and unicity of the experiment device is avoided, so the utilization range of the experiment device is expanded.

Figure 1:
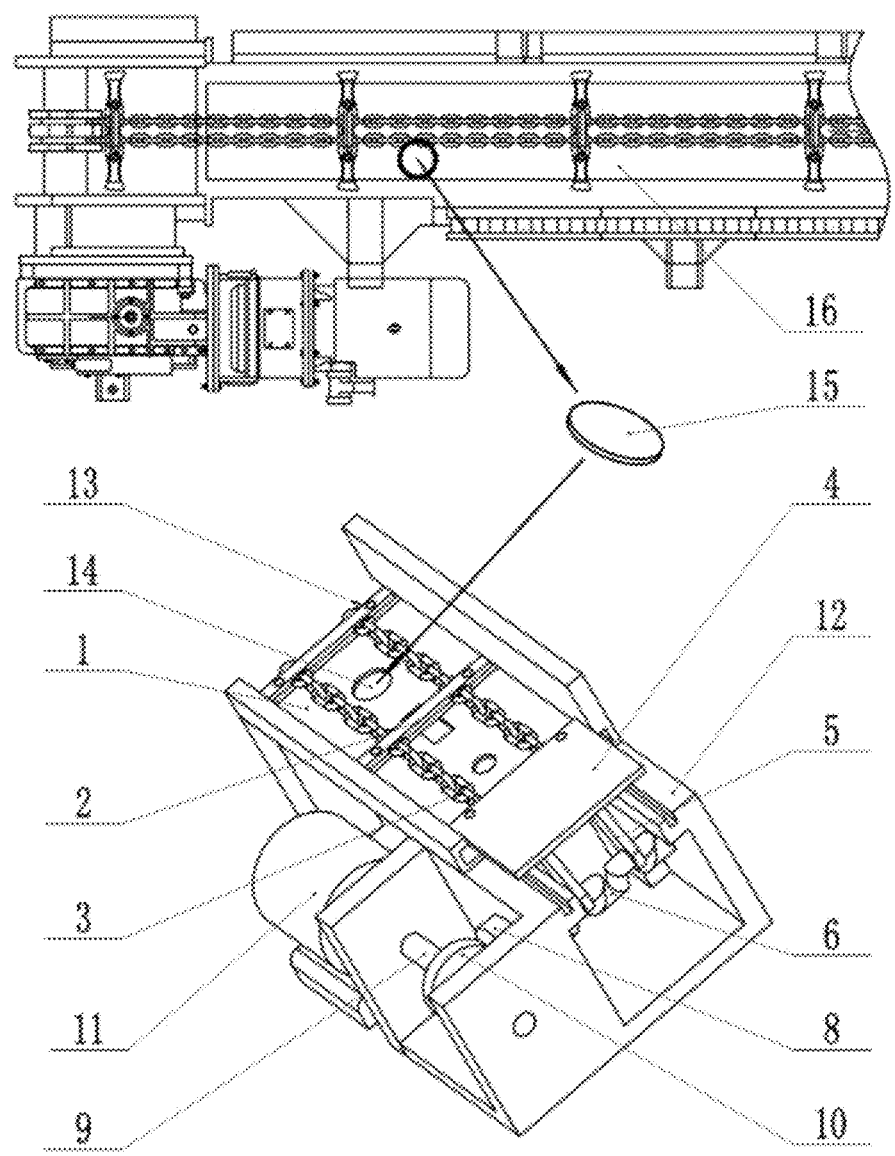
FIG. 1 is a 3D view of a device of the invention.
Figure 2:
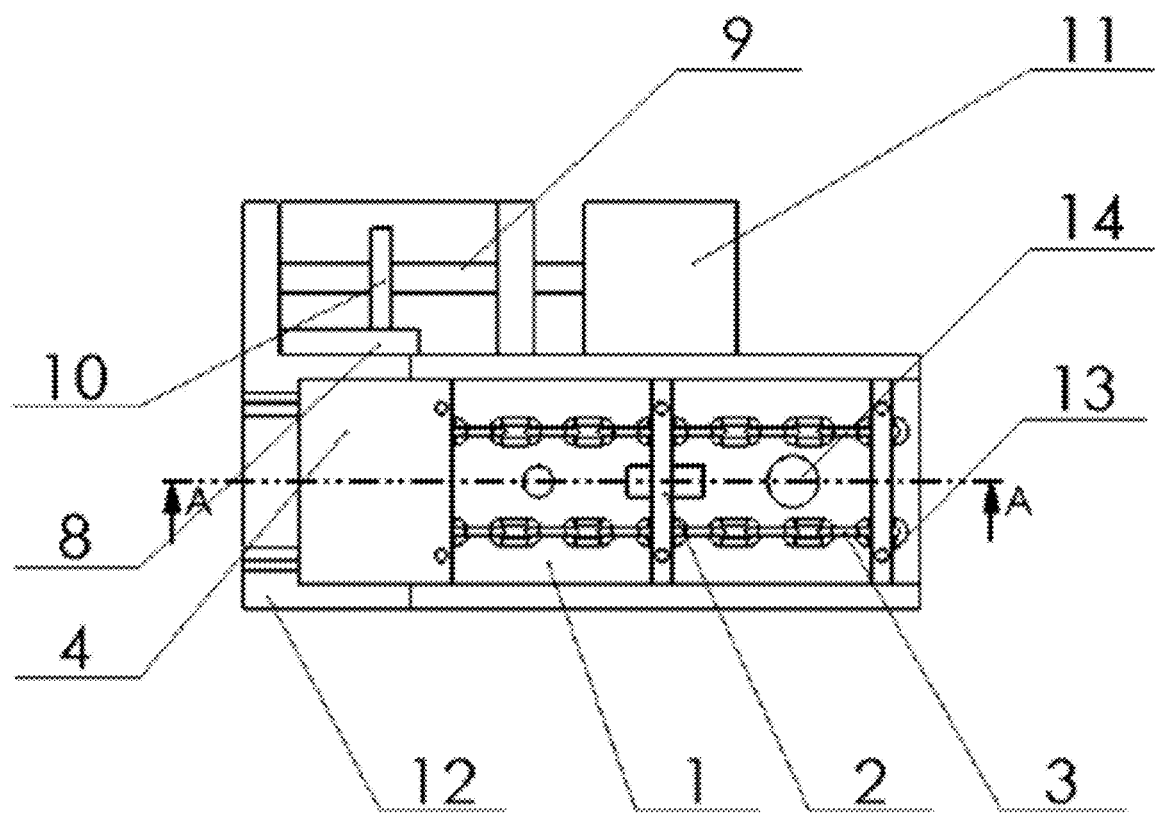
FIG. 2 is a top view of the device of the invention.
Figure 3:
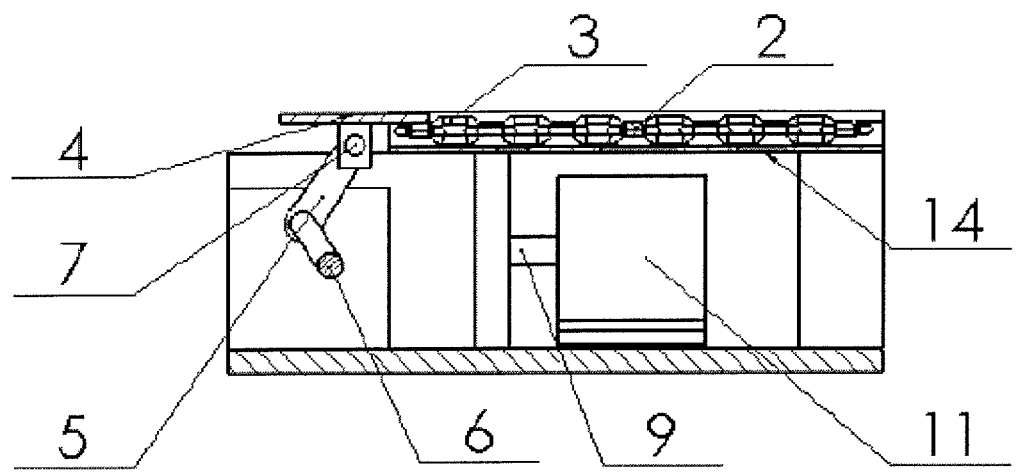
FIG. 3 is a sectional view along line A-A in FIG. 2.
Figure 4:
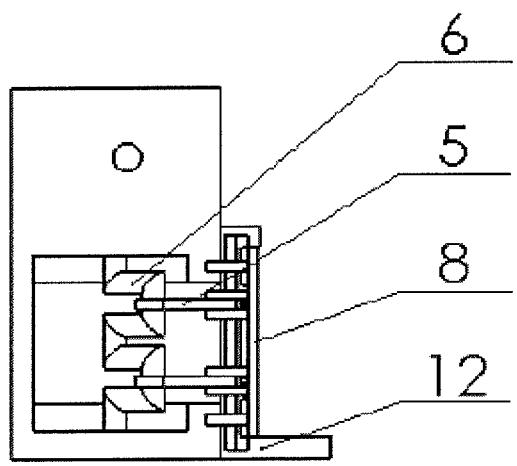
FIG. 4 is a left view of FIG. 2.

In the figures: 1. material groove; 2. scraper; 3. scraper chain; 4. connecting block; 5. connecting rod; 6. crankshaft; 7. pin shaft; 8. friction driven wheel; 9. motor shaft; 10. friction driving wheel; 11. motor; 12. rack; 13. scraper fixed pin; 14. test piece hole; 15. test piece; 16. conveyor.

EMBODIMENTS

The present invention is further illustrated below through examples, but not limited to the following examples.

EXAMPLES

As shown in FIGS. 1-4, an experiment device for detecting abrasion of a conveyer includes a rack, a reciprocation sliding mechanism, a speed adjusting mechanism and a crankshaft.

The rack 12 is a main body for bearing various components; the reciprocation sliding mechanism and the crankshaft 6 are fixed on one side of the rack 12, and the speed adjusting mechanism is fixed on the other side of the rack 12.

The reciprocation sliding mechanism includes scrapers 2 and scraper chains 3; the scraper chains 3 are arranged between an upper-layer scraper 2 and a lower-layer scraper 2; the upper-layer scraper 2 and the lower-layer scraper 2 forms a group; several groups of scrapers 2 are arranged in parallel; a material groove 1 is fixed inside the rack 12; the scrapers 2 are placed on the material groove 1 and move in a reciprocating manner; the end of the rack 12 is provided with a connecting block 4; and the upper-layer and the lower-layer scrapers 2 are connected with the connecting block 4 through a scraper fixed pin 13.

The lower part of the connecting block 4 is fixedly connected with two connecting rods 5 through a pin shaft 7, and the upper part of the connecting block 4 is connected with the scrapers 2;

The speed adjusting mechanism includes a motor 11, a friction driving wheel 10 and a friction driven wheel 8; the motor 11 is connected with the friction driving wheel 10 through a motor shaft 9; the friction driving wheel 10 slides on the motor shaft 9 in an axial direction; speed adjustment is realized by changing a distance between the centers of the friction driving wheel 10 and the friction driven wheel 8; the motor 11 is a speed adjusting motor that realizes a motor output speed by adjusting a frequency.

The shaft of the friction driven wheel is connected with the crankshaft 6; the friction driven wheel 8 is in interference fit with the crankshaft 6; the crankshaft 6 is fixed with the connecting block 4 through two connecting rods 5 to drive the scraper chains 3 and the scrapers 2 in a reciprocating manner at the adjusted speed, so as to realize reciprocation motion of the material in the material groove 1; and friction between the friction pairs when the actual conveyer conveys the material can be simulated well, thus experiments on the complex conveyer structure can be avoided.

In the experiment device, the speed adjusting mechanism is driven by the friction wheel to change a distance between the centers of the driving wheel and the driven wheel, so as to realize speed change of the system.

In the experiment device, the material groove 1 is provided with a circular or a square test piece hole 14; a pressure sensor is directly placed on the bottom of a test piece 15 taken from a conveyor 16; the test piece 15 is placed in the test piece hole 14 (see, e.g., FIG. 1).

In the experiment device, the crankshaft 6 consists of 2 cranks.

In the experiment device, the sliding speed of the reciprocation sliding mechanism is 1 m/min to 5 m/min.

In the experiment device, the contact surface of the friction driving wheel 10 and the friction driven wheel 8 has a hatching knurling structure.

In the experiment device, the upper-layer and lower-layer scrapers 2 are connected through a scraper fixed pin 3; a flat-link chain of the scraper chain is clamped by the scraper fixed pin 13; the connecting block 4 and the connecting rods 5 are connected with a pin shaft 7; and rotational motion of the crankshaft 6 is transformed into reciprocation motion of the material driven by the scrapers.

The present invention provides a method for detecting abrasion of a conveyer, including the following steps:

(1) machining an object to be measured into a sheet test piece, weighing the mass $m_1$ of the sheet with a balance before experiment, then placing the sheet test piece in a test piece hole formed on a material groove; placing a material to be simulated in the material groove; measuring a material pressure on the test object by a pressure sensor arranged on the bottom of the test piece, and recording data;
(2) setting an output rotational speed of the motor according to the sliding speed required in the experiment;
(3) washing the measured object after the experiment is finished, then weighing by the balance to obtain the mass $m_2$ after experiment;
(4) finally calculating to obtain the mass difference $m_2-m_1$, i.e., abrasion loss of the test piece during experiment.

In the above method, the sheet test piece has a cuboid or cylindrical structure with a size of 100×60×10 mm, or Φ60×10 mm, or Φ80×10 mm.

The invention claimed is:

1. An experiment device for aiding in measuring abrasion of a conveyer by testing a test piece of the conveyer, characterized in that, it comprises a rack, a reciprocation sliding mechanism, a speed adjusting mechanism and a crankshaft;

the rack is a main body for bearing various components;
the reciprocation sliding mechanism and the crankshaft are fixed on one side of the rack, and the speed adjusting mechanism is fixed on the other side of the rack;

the reciprocation sliding mechanism includes scrapers and scraper chains; the scraper chains are arranged between an upper-layer scraper and a lower-layer scraper; the upper-layer scraper and the lower-layer scraper forms a group; a plurality of groups of scrapers are arranged in parallel; a material groove is fixed inside the rack; the scrapers are placed on the material groove and move in a reciprocating manner; the end of the rack is provided with a connecting block; and the scrapers at ends of the scraper chains are connected with the connecting block;

the lower part of the connecting block is fixedly connected with two connecting rods through a pin shaft, and the upper part of the connecting block is connected with the scrapers;

the speed adjusting mechanism includes a motor, a friction driving wheel and a friction driven wheel; the motor is connected with the friction driving wheel through a motor shaft; the friction driving wheel slides on the motor shaft in an axial direction; speed adjustment is realized by changing a distance between the centers of the friction driving wheel and the friction driven wheel; the motor is a speed adjusting motor that realizes a motor output speed by adjusting a frequency; and the shaft of the friction driven wheel is connected with the crankshaft; the driven wheel is in interference fit with the crankshaft; the crankshaft is fixed with the connecting block through two connecting rods to drive the scraper chains and the scrapers in a reciprocating manner, so as to realize reciprocation motion of the material in the material groove.

2. The experiment device according to claim 1, characterized in that: the test piece is machined from the conveyor to be measured, the material groove is provided with a circular or a square test piece hole; a pressure sensor is directly placed on the bottom of the test piece; and the test piece is placed in the test piece hole.

3. The experiment device according to claim 1, characterized in that: the crankshaft consists of 2 cranks.

4. The experiment device according to claim 1, characterized in that, the sliding speed of the reciprocation sliding mechanism is 1 m/min to 5 m/min.

5. The experiment device according to claim 1, characterized in that: the contact surface of the friction driving wheel and the friction driven wheel has a hatching knurling structure.

6. The experiment device according to claim 1, characterized in that, the upper-layer scrapers and lower-layer scrapers are connected through a fixed pin; a flat-link chain of the scraper chain is clamped by the scraper fixed pin; the connecting block and the connecting rods are connected with a pin shaft; and rotational motion of the crankshaft is transformed into reciprocation motion of the material driven by the scrapers.

7. An experiment method for measuring abrasion of the conveyer using the experiment device of claim 1, characterized in that, it comprises the following steps:

(i) machining an abrasion part of the conveyer into a sheet test piece corresponding to the shape of a test piece hole of the material groove of the experiment device, weighing the mass m1 of the sheet test piece with a balance before experiment, then placing the sheet test piece in the test piece hole formed on the material groove; placing a material to be simulated in the material groove; measuring a material pressure on the test piece by a pressure sensor arranged on the bottom of the test piece, and recording data;

(ii) setting an output rotational speed of the motor according to the sliding speed required in the experiment, and controlling a scraper chain to reciprocate within a certain time;

(iii) washing the test piece after the experiment is finished, then weighing the test piece by the balance to obtain the mass m2 of the test piece after experiment; and (iv) finally calculating to obtain the mass difference m2−m1, which is the abrasion loss of the test piece during experiment.

8. The experiment method according to claim 7, characterized in that: the sheet test piece is a rectangular cuboid with a size of 100×60×10 mm.

9. The experiment method according to claim 7, characterized in that: the sheet test piece is a cylindrical structure with a size of 60 mm in diameter and 10 mm in length.

10. The experiment method according to claim 7, characterized in that: the sheet test piece is a cylindrical structure with a size of 80 mm in diameter and 10 mm in length.

* * * * *